United States Patent [19]

Carbrey

[11] 3,849,607

[45] Nov. 19, 1974

[54] POLARITY REVERSAL SWITCHING CIRCUIT

[75] Inventor: Robert Lawrence Carbrey, Boulder, Colo.

[73] Assignee: Bell Telephone Laboratories, Incorporated, Murray Hill, N.J.

[22] Filed: May 2, 1973

[21] Appl. No.: 356,317

[52] U.S. Cl. .............. 179/86, 179/18 AH, 307/262, 307/247 R

[51] Int. Cl. .......................................... H03k 17/00

[58] Field of Search ..... 179/86, 1 SW, 18 AF, 18 F, 179/18 FA, 18 AH, 18 AD, 18 HA, 6.3 R, 18 GF; 307/257, 250, 262, 247 R

[56] References Cited

UNITED STATES PATENTS 2,700,927 10/1972 Dalley ................................ 307/257

3,247,323 4/1966 Carroll ................................ 307/250

3,700,926 10/1972 Dalley ................................ 307/257

*Primary Examiner*—Kathleen H. Claffy

*Assistant Examiner*—Joseph A. Popek

*Attorney, Agent, or Firm*—J. S. Cubert

[57] ABSTRACT

In a telephone type system wherein battery reversal signaling is employed, a polarity reversal switching circuit utilizing alternately enabled switch arrangements is connected between an electronic exhange circuit and a trunk. The switching circuit is operative to reverse the voltage polarity at the trunk for signaling purposes while maintaining the voltage polarity at the exchange circuit invariant for proper operation of electronic devices such as transistors in the exchange circuit. In either condition of the polarity reversal switching circuit, a voice signal path is established between the exchange and the trunk.

15 Claims, 2 Drawing Figures

POLARITY REVERSAL SWITCHING CIRCUIT

BACKGROUND OF THE INVENTION

This invention relates to signaling arrangements in communication systems and more particularly with polarity reversal signaling in telephone systems having electronic circuits.

In telephone and other communication systems, it is common to interconnect an exchange such as a private branch exchange to a central office through a trunk. The trunk is operative to transmit voice or other intelligence between stations associated with the exchange and the connected central office and also to transmit signaling information pertaining to the call connection. One form of signaling termed "reverse battery signaling" may be utilized in such connections to a central office. In this form of signaling, the potentials on the tip and ring conductors of the trunk connected between the exchange and the central office are reversed responsive to control signals. This arrangement is generally used to delay forwarding of the dialed station number until a dial pulse register is assigned and to indicate answering by a called party but is also useful for other signaling. In exchange circuits using devices insensitive to potential reversals such as relays or transformers, battery reversal signaling presents no problems. Where, however, electronic devices such as transistors are connected directly to the trunk, the reversal of voltage polarity may render such devices inoperative. If the battery reversal signal originates at the central office termination of the trunk, relay devices thereat may be used to reverse polarity and a diode rectifier bridge can be inserted between the exchange terminal of the trunk and the exchange electronic circuit so that proper operation of electronic devices is obtained. There are some signaling arrangements, however, in which the reversal signaling originates at the exchange terminal of the trunk. In such arrangements, a diode rectifier bridge is not effective to provide the proper potentials for the exchange electronic device during the reversal of polarity on the connected tip and ring conductors.

BRIEF SUMMARY OF THE INVENTION

My invention is a polarity reversal switching circuit having first and second terminals that may be connected to an electronic circuit and third and fourth terminals that may be connected to a trunk. The switching circuit is arranged so that the potentials on the first and second terminals remain constant while the potentials on the third and fourth terminals are reversed responsive to a sequence of first and second control signals. In the polarity reversal switching circuit, a first switch connected between the first terminal and the third terminal and to a first voltage source is responsive to the first control signal to apply the first voltage to the first and third terminals and to provide an intelligence signal path between the first and third terminals. A second switch connected between the second terminal and the third terminal and to a second voltage source is responsive to the first control signal to apply the second voltage to the second and fourth terminals and to provide an intelligence signal path between the second and fourth terminals. A third switch connected between the first and fourth terminals and to the first voltage source is responsive to the second control signal to apply the first voltage to the first and fourth terminals and to provide an intelligence signal path between the first and fourth terminals. A fourth switch connected between the second and third terminals and to the second voltage source is responsive to the second control signal to apply the second voltage to the second and third terminals and to provide an intelligence signal path between the second and third terminals. The polarity of the voltages applied to the first and second terminals remains the same responsive to both first and second control signals while the polarity of the voltages applied to the third and fourth terminals reverses responsive to an alternating sequence of the first and second control signals as required for signaling purposes.

According to one aspect of the invention, each of the first and third switches includes a coupling device having first, second and control electrodes and a pair of switching devices each having first and second electrodes. The coupling device first electrode is connected to the first voltage source. The coupling device control electrode is connected to a control signal source and the coupling device second electrode is connected to the junction of the switching device first electrodes through an impedance. In the first switch, one switching device second electrode is connected to the first terminal and the other switching device second electrode is connected to the third terminal. In the third switch, one switching device second electrode is connected to the first terminal and the other switching device second electrode is connected to the fourth terminal.

Each of the second and fourth switches includes a coupling device having first, second and control electrodes and a pair of switching devices each having first and second electrodes. The coupling device first electrode is connected to the second voltage source. The coupling device control electrode is connected to the control signal source and the coupling device second electrode is connected to the junction of the switching device second electrodes through an impedance. In the second switch, one switching device first electrode is connected to the second terminal and the other switching device first electrode is connected to the fourth terminal. In the fourth switch, one switching device first electrode is connected to the second terminal and the other switching device first electrode is connected to the third terminal.

According to another aspect of the invention, each of the first and third switches includes a transistor having a base, an emitter and a collector and a pair of diodes each having an anode and a cathode. The collector of the transistor is connected to the first voltage source. The base of the transistor is connected to a control signal source and the emitter of the transistor is connected to the junction of the anodes of the two diodes through an impedance. In the first switch, one diode cathode is connected to the first terminal and the other diode cathode is connected to the third terminal. In the third switch, one diode cathode is connected to the first terminal and the other diode cathode is connected to the fourth terminal.

Each of the second and fourth switches includes a transistor having a base, an emitter and a collector and two diodes each having an anode and a cathode. The transistor collector is connected to the second voltage source. The transistor base is connected to the control signal source and the transistor emitter is connected to the junction of the diode cathodes through an impedance. In the second switch, one diode anode is connected to the second terminal and the other diode anode is connected to the fourth terminal. In the fourth switch, one diode anode is connected to the second terminal and the other diode anode is connected to the third terminal.

In response to the first control signal, the first and second switch transistors are turned on so that the first terminal is connected to the third terminal through the conducting first switch diodes and the second terminal is connected to the fourth terminal through the conducting fourth switch diodes. In response to the second control signal, the third and fourth switch transistors are turned on so that the first terminal is connected to the fourth terminal through the conducting third switch diodes and the second terminal is connected to the third terminal through the conducting fourth switch diodes.

According to another aspect of the invention, the first voltage source produces a positive voltage and the second voltage source produces a negative voltage. The positive voltage is always applied to the first terminal and the negative voltage is always applied to the second terminal for proper operation of the electronic device connected to said first and second terminals. When the first and second switches are conducting, the third terminal receives a positive voltage and the fourth terminal receives a negative voltage. When the third and fourth switches are conducting, the third terminal receives a negative voltage and the fourth terminal receives a positive voltage in accordance with the polarity reversal signaling.

According to another aspect of the invention, the first voltage source is a ground reference source and the second voltage source produces a negative battery voltage.

According to one feature of the invention, the switch transistors are simultaneously controlled through a single bistable circuit so that the turn on of the first and second switch transistors occurs at the same time as the turn off of the third and fourth switch transistors and the turn on of the third and fourth switch transistor occurs at the same time as the turn off of the first and second transistors.

According to another feature of the invention, each switch transistor is operative to isolate the intelligence signals appearing at the first, second and third and fourth terminals from the connected voltage source so that crosstalk between polarity reversal switches associated with the same voltage sources in an exchange is reduced.

According to yet another feature of the invention, the switches provide polarity reversal signaling at the third and fourth terminals, proper potentials for the electronic device connected between the first and second terminals in either switching circuit condition, and a path for transmission of intelligence signals between the first and second terminals and the third and fourth terminals in either switching circuit condition.

DETAILED DESCRIPTION

Figure 1:
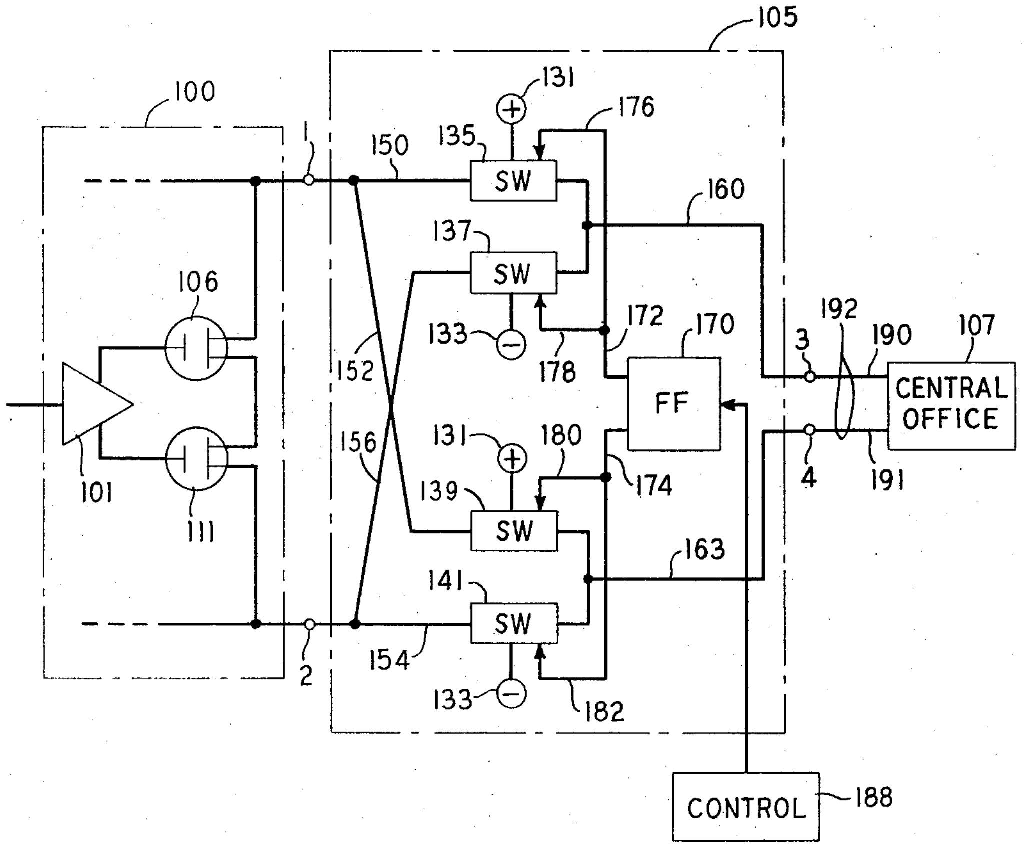
FIG. 1 depicts a block diagram of an embodiment illustrative of the invention.

FIG. 1 shows polarity reversal switching circuit 105 connected between trunk exchange circuit 100 and trunk 192 which is further connected to central office 107. Only the portions of electronic circuit 100 associated with polarity reversal switching circuit 105 are shown. The portion includes amplifier 101 which receives signals originating in the associated exchange and insulated gate field effect transistors (IGFETs) 106 and 111. IGFET 106 is an n-type device having a drain connected to terminal 1, a source connected to the drain of p-type IGFET 111, and a gate connected to one output of amplifier 101. IGFET 111 has its drain connected to terminal 2 and its gate connected to the other output of amplifier 101. IGFETs 106 and 111 form an output amplifier which serves to drive trunk 192 through polarity reversal switching circuit 105. For proper operation of IGFETs 106 and 111, it is necessary that a positive voltage be applied to terminal 1 and a negative voltage be applied to terminal 2. With this voltage polarity arrangement, both IGFETs are conductive in their linear range of operation and the desired amplification is accomplished. It is to be understood that the output amplifier may consist of devices other than the IGFETs such as transistors which also require the same supply voltage arrangements.

Polarity reversal switching circuit 105 is connected between terminals 1 and 2 and terminals 3 and 4. Circuit 105 provides the necessary supply voltages for circuit 100 through terminals 1 and 2 and supplies d.c. voltage to trunk 192 via terminals 3 and 4. In order to provide polarity reversal, signaling circuit 105 is adapted to reverse the voltage polarity across terminals 3 and 4. In one state of circuit 105, terminal 3 and tip conductor 190 connected thereto receive a positive voltage and terminal 4 and ring conductor 191 connected thereto receives a negative voltage. In the other state of circuit 105, terminal 3 and tip conductor 190 receive a negative voltage and terminal 4 and ring conductor 191 receive a negative voltage.

Polarity reversal switching circuit 105 comprises positive voltage source 131 and negative voltage source 133. Positive voltage source 131 is connected to switches 135 and 139 while negative voltage source 133 is connected to switches 137 and 141. Control 188 provides first and second control signals which are applied to bistable circuit 170 to change the state of bistable circuit 170 in accordance with the polarity reversal arrangements. One output of bistable 170 is connected to switch 135 via leads 172 and 176 and to switch 137 via leads 172 and 178. In response to a first control signal from control 188, the voltage on leads 176 and 178 are such that switch 135 is turned on and switch 137 is off.

The other output of bistable 170 is connected to switch 139 via leads 174 and 180 and to switch 141 via leads 174 and 182. In response to the first control signal, the voltage on leads 180 and 182 are such that switch 139 is off while switch 141 is on. In response to the second control signal, the state of bistable circuit 170 is reversed so that switches 137 and 139 are on and switches 135 and 141 are off.

Assume for purposes of illustration that bistable circuit 170 is in a first state responsive to the first control signal from control 188. In this event, switches 135 and 141 are on and switches 137 and 139 are off. Switch 135 provides a signal path between terminals 1 and 3 through leads 150 and 160 and is effective to apply a positive voltage from source 131 to both terminals 1 and 3 via leads 150 and 160, respectively. Switch 141 when on provides a signal path between terminals 2 and 4 through leads 154 and 163 and also allows the negative voltage from source 133 to be applied to terminal 2 through lead 154 and to terminal 4 through lead 163. Thus, terminal 1 receives a positive voltage and terminal 2 receives a negative voltage whereby IGFETs 106 and 111 are operative and terminals 3 and 4 receive positive and negative voltages, respectively.

When the second control signal is applied to bistable circuit 170 from control 188, switches 135 and 141 are turned off and switches 137 and 139 are turned on. In its on condition, switch 137 provides a signal path between terminal 2 and terminal 3 via leads 156 and 160, and also supplies a negative voltage to both terminals 2 and 3. When switch 139 is closed, a signal path is established between terminals 1 and 4 via leads 152 and 163 and the positive voltage from source 131 is applied both to terminal 1 and terminal 4. Thus, in response to the second control signal, terminal 1 receives a positive voltage while terminal 2 receives a negative voltage as required for proper operation of IGFETs 106 and 111 while the voltage on terminal 4 is positive and the voltage of terminal 3 is negative in accordance with the polarity reversal signaling arrangement.

When bistable circuit 170 is in its first state responsive to the first control signal from control 188, terminal 1 is connected to terminal 3 via switch 135 so that speech or other intelligence signals may be transmitted in either direction through switch 135 between terminals 1 and 3. In similar manner, switch 141 provides a signal path between terminals 2 and 4 whereby speech or other intelligence signals may be transferred in either direction between terminals 2 and 4 through switch 141. When bistable circuit 170 is in its second state responsive to the second control signal from control 188, switches 135 and 141 no longer provide signal paths but switches 137 and 139 are on and provide signal paths. In response to the second control signal, the path between terminals 2 and 3 through switch 137 allows speech or other intelligence signals to pass in either direction between terminals 2 and 3 and the path between terminals 1 and 4 through switch 139 permits speech or other intelligence to pass therebetween. In accordance with the invention, the voltages on terminals 1 and 2 remain the same for either state of circuit 105 and proper operation of IGFETs 106 and 111 is assured. At the same time, polarity reversal switching of circuit 105 reverses the polarity of the voltage across terminals 3 and 4 whereby polarity reversal signaling to central office 107 is obtained.

Figure 2:
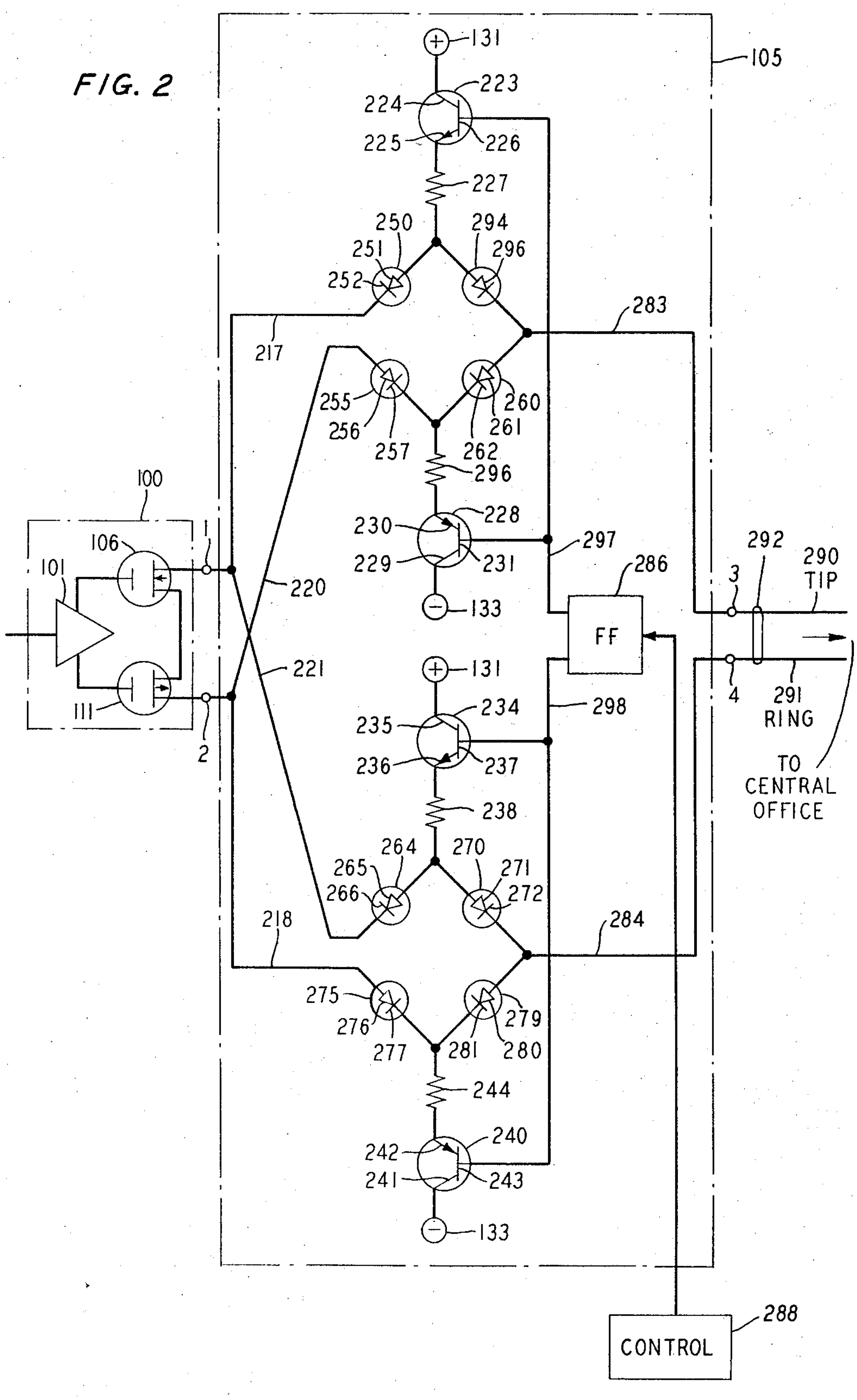
FIG. 2 shows a schematic diagram of the embodiment of FIG. 1.

FIG. 2 shows a schematic diagram of polarity reversal switch 105 wherein the switches of circuit 105 are shown in detail. Switch 135 of FIG. 1 corresponds to the circuit in FIG. 2 which includes NPN transistor 223, impedance 227 and diodes 250 and 294. Switch 137 of FIG. 1 corresponds to the arrangement in FIG. 2 which includes PNP transistor 228, impedance 296 and diodes 255 and 260. Switch 139 of FIG. 1 corresponds to the arrangement in FIG. 2 including NPN transistor 234, impedance 238 and diodes 264 and 270 while switch 141 of FIG. 1 corresponds to the arrangement in FIG. 2 including PNP transistor 240, impedance 244 and diodes 275 and 279.

A first control signal sent from control 288 to flip-flop 286 is effective to switch flip-flop 286 to a first state whereby the voltage on lead 297 becomes positive going and the voltage on lead 298 becomes negative going. Lead 297 connects flip-flop 286 to the base electrodes of transistors 223 and 228. The positive voltage at base 226 of transistor 223 renders transistor 223 conductive and provides a current path from collector 224 to emitter 225 so that the voltage supplied to the junction of the anodes of diodes 250 and 294 is positive. Diodes 250 and 294 turn on in response to the positive voltage from impedance 227. The positive voltage at anode 251 of diode 250 is supplied to terminal 1 via lead 217 while the positive voltage at anode 296 is supplied to terminal 3 through diode 294 and lead 283. PNP transistor 228 is rendered nonconductive by the positive voltage at base 231 so that negative voltage source 133 is disconnected from impedance 296 and diodes 255 and 260 are nonconductive.

With flop-flop 286 in its first state, the output of flip-flop 286 on lead 298 is negative and this negative voltage is applied to base 237 of NPN transistor 234 and to base 243 of PNP transistor 240 whereby transistor 234 is rendered nonconductive and transistor 240 is rendered conductive. The negative voltage from source 133 is supplied through the collector-emitter path of transistor 240 and impedance 244 to the junction of cathodes 277 and 281 of diodes 275 and 279. In this way, diodes 275 and 279 are rendered conductive and a negative voltage is supplied to terminal 2 via diode 275 and lead 218 while this negative voltage is supplied to terminal 4 via diode 279 and lead 284. Thus, as required responsive to the first control signal, a positive voltage appears on terminals 1 and 3 and a negative voltage appears on terminals 2 and 4.

The path from terminal 1 to terminal 3 via lead 217, conducting diodes 250 and 294 and lead 283 is effective to transmit speech or other intelligence signals between terminals 1 and 3. These diodes are maintained in their conductive states through transistor 223. The magnitude of the speech or other intelligence signals is small compared to the d.c. voltage from transistor 223 and impedance 227 whereby diodes 250 and 294 always conductive for the a.c. speech or other intelligence signals. It should be noted that the d.c. voltage drops across diodes 250 and 294 may be made relatively equal so that there is no net d.c. voltage drop between terminals 1 and 3. Diodes 275 and 279 are also conductive responsive to the first control signal; and in a similar manner to that described with respect to diodes 250 and 294, the negative voltage from source 133 is supplied to terminals 2 and 4 and speech or other intelligence signals are transmitted between terminals 2 and 4.

When it is desired to reverse the voltage polarity across terminals 3 and 4, a second control signal is sent from control 288 to flip-flop 286. This control signal is effective to reverse the state of flip-flop 286 so that a negative voltage appears on lead 297 and a positive voltage appears on lead 298. The negative voltage on lead 297 turns NPN transistor 223 off whereby positive voltage source 131 is disconnected from diodes 250 and 294 and these diodes become nonconductive. PNP transistor 228, however, is rendered conductively by the negative voltage on lead 297 so that negative voltage source 133 is connected to the junction of cathodes 257 and 260 via the collector emitter path of transistor 228 and impedance 296. Diodes 255 and 260 are thereby rendered conductive and a negative voltage is applied to terminals 2 and 3. A signal path is established between terminals 2 and 3 through lead 220, diodes 255 and 260 and lead 283. Conducting diodes 255 and 260 are effective to transmit speech or other intelligence signals in either direction between terminals 2 and 3 since the signals are relatively small compared to the negative voltage from source 133.

The positive voltage on lead 298 responsive to the second control signal applied to flip-flop 286 is supplied to transistors 234 and 240. NPN transistor 234 is rendered conductive by the positive voltage at base 237 while PNP transistor 240 is rendered nonconductive by the positive voltage at base 243. Thus, diodes 275 and 279 are turned off and diodes 264 and 270 are turned on. Diodes 264 and 270 are connected to positive voltage source 131 through the collector-emitter path of transistor 234 and impedance 238. In this way, a positive voltage is applied to terminal 1 through diode 264 and lead 221 and the positive voltage is applied to terminal 4 through diode 270 and lead 284. Since both diodes 264 and 270 are conductive, a signal path is established between terminals 1 and 4 and speech or other intelligence signals may be transmitted therebetween as previously described. Thus, in response to the second control signal, a positive voltage appears on terminal 1 while a negative voltage appears on terminal 2 so that IGFETs 106 and 111 are operative. At the same time, the voltage at terminal 3 is negative while the voltage at terminal 4 is positive whereby polarity reversal signaling at these terminals is obtained.

The biasing for transistors 223, 228, 234, and 240 is arranged so that these transistors operate in their linear range. Thus, each of these transistors provides a relatively large impedance between the connected voltage source and the signal path associated therewith. Advantageously, this high impedance prevents intelligence on the signal path from being coupled to the associated voltage source. In this way, crosstalk between signal paths using the same voltage sources is prevented.

What is claimed is:

1. A voltage polarity reversal switching circuit comprising a first and second terminal pair, a third and fourth terminal pair, a first d.c. voltage source, a second d.c. voltage source, control means for producing first and second control signals, first means connected to said first d.c. voltage source and said first and third terminals responsive to said first control signal for establishing a signal path between said first and third terminals and for supplying said first d.c. voltage from said first d.c. voltage source to said first and third terminals, second means connected to said second d.c. voltage source and said second and fourth terminals responsive to said first control signal for establishing a signal path between said second and fourth terminals and for supplying said second d.c. voltage from said second d.c. voltage source to said second and fourth terminals, third means connected to said first d.c. voltage source and said first and fourth terminals responsive to said second control signal for establishing a signal path between said first and fourth terminals and for supplying said first d.c. voltage from said first d.c. voltage source to said first and fourth terminals, and fourth means connected between said second d.c. voltage source and said second and third terminals responsive to said second control signal for establishing a signal path between said second and third terminals and for supplying said second d.c. voltage from said second d.c. voltage source to said second and third terminals whereby the d.c. voltage polarity across said first and second terminal pair remains invariant and the voltage polarity across said third and fourth terminal pair is reversible.

2. A polarity reversal switching circuit comprising a first and second terminal pair, a third and fourth terminal pair, a first d.c. voltage source, a second d.c. voltage source, control means for generating first and second control signals, first switching means connected between said first and third terminals and to said first d.c. voltage source responsive to said first control signal for applying the first d.c. voltage from said first d.c. voltage source to said first and third terminals and for maintaining a bidirectional signal path between said first and third terminals, second switching means connected between said second and fourth terminals and to said second d.c. voltage source responsive to said first control signal for applying said d.c. voltage from said second d.c. voltage source to said second and fourth terminals and for maintaining a bidirectional signal path between said second and fourth terminals, third switching means connected between said first and fourth terminals and to said first d.c. voltage source responsive to said second control signal for applying said first d.c. voltage from said first d.c. voltage source to said first and fourth terminals and for maintaining a bidirectional signal path between said first and fourth terminals, and fourth switching means connected between said second and third terminals and to said second d.c. voltage source responsive to said second control signal for applying said second d.c. voltage from said second d.c. voltage source to said second and third terminals and for maintaining a bidirectional signal path between said second and third terminals.

3. A polarity reversal switch circuit according to claim 2 wherein said first switching means comprises a coupling device having first, second and control electrodes and a pair of switching devices each having first and second electrodes, said coupling device first electrode being connected to said first d.c. voltage source, the first electrodes of said switching devices being joined together, means for connecting said coupling device second electrode to the junction of said switching device first electrodes, the second electrode of one of said switching devices being connected to said first terminal, the second electrode of said other switching device being connected to said third terminal, and means connected between said control means and said coupling device control electrode for applying said first control signal to said coupling device control electrode, said coupling device and said pair of switching devices being rendered conductive reponsive to said first control signal.

4. A polarity reversal switch circuit according to claim 3 wherein said second switching means comprises a coupling device having first, second and control electrodes and a pair of switching devices, each having first and second electrodes, said coupling device first electrode being connected to said second d.c. voltage source, the second electrodes of said switching devices being joined together, means for connecting said coupling device second electrode to the junction of said switching device second electrodes, the first electrode of one of said switching devices being connected to said second terminal, the first electrode of said other switching device being connected to said fourth terminal, and means connected between said control means and said coupling device control electrode for applying said first control signal to said coupling device control electrode, said second switching means coupling device and pair of switching devices being rendered conductive responsive to said first control signal.

5. A polarity reversal switch circuit according to claim 4 wherein said third switching means comprises a coupling device having first, second and control electrodes and a pair of switching devices each having first and second electrodes, said coupling device first electrode being connected to said first d.c. voltage source, the first electrodes of said switching devices being joined together, means for connecting said coupling device second electrode to the junction of said switching device first electrodes, the second electrode of one of said switching devices being connected to said first terminal, the second electrode of other switching device being connected to said fourth terminal, and means connected between said control means and said coupling device control electrode for applying said second control signal to said coupling device control electrode, said third switching means coupling device and pair of switching devices being rendered conductive responsive to said second control signal.

6. A polarity reversal switch circuit according to claim 5 wherein said fourth switching means comprises a coupling device having first, second and control electrodes and a pair of switching devices each having first and second electrodes, said coupling device first electrode being connected to said second d.c. voltage source, the second electrodes of said switching devices being joined together, means for connecting said coupling device second electrode to the junction of said switching device second electrodes, the first electrode of one of said switching devices being connected to said second terminal, the first electrode of said other switching device being connected to said third terminal, and means connected between said control means and said coupling device control electrode for applying said second control signal to said coupling device control electrode, said fourth switching means coupling device and said pair of switching devices being rendered conductive responsive to said second control signal.

7. A polarity reversal switch circuit according to claim 6 wherein each switching means coupling device comprises a transistor having a collector, an emitter and a base, said transistor collector corresponding to said coupling device first electrode, said transistor emitter corresponding to said coupling device second electrode, and said transistor base corresponding to said coupling device control electrode, and each of said first, second, third and fourth switching means switching device comprises a diode having an anode and a cathode, said diode anode corresponding to said switching device first electrode, and said diode cathode corresponding to said switching device second electrode.

8. A polarity reversal switch circuit according to claim 7 wherein each first and third switching means transistor comprises an NPN transistor and wherein each second and fourth switching means transistor comprises a PNP transistor.

9. A polarity reversal switching circuit according to claim 8 wherein said first d.c. voltage source comprises a positive d.c. voltage source and said second d.c. voltage source comprises a negative d.c. voltage source.

10. A polarity reversal switching circuit according to claim 8 wherein said first d.c. voltage source comprises a ground reference voltage source and said second d.c. voltage source comprises a negative battery.

11. In a communication system having an electronic trunk circuit and a trunk, a polarity reversal circuit connected between said circuit and said trunk comprising first and second terminals connected to said circuit and third and fourth terminals connected to said trunk, a relatively positive voltage source, a relatively negative voltage source, means for generating first and second control signals, first means connected to said positive voltage source and said first and third terminals responsive to said first control signal for supplying a relatively positive voltage from said positive voltage source to said first and third terminals and for transmitting signals between said first and third terminals, second means connected to said negative voltage source and said second and fourth terminals responsive to said first control signal for supplying a relatively negative voltage from said negative voltage source to said second and fourth terminals and for transmitting signals between said second and fourth terminals, third means connected to said positive voltage source and said first and fourth terminals responsive to said second control signal for supplying a relatively positive voltage from said positive voltage source to said first and fourth terminals and for transmitting signals between said first and fourth terminals, and fourth means connected to said negative voltage source and said second and third terminals responsive to said second control signal for supplying a relatively negative voltage from said negative voltage source to said second and third terminals, and for transmitting signals between said second and third terminals.

12. In a communication system having an electronic trunk circuit and a trunk, a polarity reversal circuit according to claim 11 wherein each of said first and third means comprises a transistor having a collector, an emitter and a base and first and second diodes each having an anode and a cathode, said transistor collector being connected to said positive voltage source, said first diode anode being connected to said second diode anode, means for connecting said transistor emitter to the junction of said first and second diode anodes, means for connecting said control source generating means to said transistor base, said first means first diode cathode being connected to said first terminal and said first means second diode cathode being connected to said third terminal, said third means first diode cathode being connected to said first terminal and said third means second diode cathode being connected to said fourth terminal.

13. In a communication system having an electronic trunk circuit and a trunk, a polarity reversal circuit according to claim 12 wherein each of said second and fourth means comprises a transistor having a collector, an emitter and a base and third and fourth diodes each having an anode and a cathode, said transistor collector being connected to said negative voltage source, said third diode cathode being connected to said fourth diode cathode, means for connecting said transistor emitter to the junction of said third and fourth diode cathodes, and means for connecting said control signal generating means to said transistor base, said second means third diode anode being connected to said second terminal and said second means fourth diode anode being connected to said fourth terminal, said fourth means third diode anode being connected to said second terminal and said fourth means fourth diode anode being connected to said third terminal.

14. In combination, an electronic exchange circuit, a central office, a trunk connected to said central office, and a polarity reversal circuit connected between said exchange circuit and said trunk comprising first and second terminals connected to said exchange circuit, third and fourth terminals connected to said trunk, a relatively positive voltage source, a relatively negative voltage source, means for generating first and second control signals, first means responsive to said first control signal for coupling said positive voltage source to said first and third terminals and for providing a signal path between said first and third terminals comprising a transistor having a collector, an emitter and a base, a pair of diodes each having a anode and a cathode, said transistor collector being connected to said positive voltage source, said diode anodes being connected together, means for connecting said transistor emitter to the junction of said diode anodes, means for applying said first control signal to said transistor base, the cathode of one of said diodes being connected to said first terminal and the cathode of the other of said diodes being connected to said third terminal, second means responsive to said first control signal for coupling said negative voltage source to said second and fourth terminals and for providing a signal path between said second and fourth terminals comprising a transistor having a collector, an emitter and a base and a pair of diodes each having an anode and a cathode, said transistor collector being connected to said negative voltage source, said diode cathodes being connected together, means for connecting said transistor emitter to the junction of said diode cathodes, means for applying said first control signal to said transistor base, the anode of one of said diodes being connected to said second terminal and the anode of the other of said diodes being connected to said fourth terminal, third means responsive to said second control signal for coupling said positive voltage source to said first and fourth terminals and for providing a signal path between said first and fourth terminals comprising a transistor having a collector, an emitter and a base and a pair of diodes each having an anode and a diode, said transistor collector being connected to said positive voltage source, said diode anodes being connected together, means for connecting said transistor emitter to the junction of said diode anodes, means for applying said second control signal to said transistor base, the cathode of one of said diodes being connected to said first terminal and the cathode of the other of said diodes being connected to said fourth terminal, and fourth means responsive to said second control signal for coupling said negative voltage source to said second and third terminals and for providing a signal path between said second and third terminals comprising a transistor having a collector, an emitter and a base and a pair of diodes each having an anode and a cathode, said transistor collector being connected to said negative voltage source, said diode cathodes being connected together, means for connecting said transistor emitter to the junction of said diode cathodes, means for applying said second control signal to said transistor base, the anode of one of said diodes being connected to said second terminal and the anode of the other of said diodes being connected to said third terminal.

15. A polarity reversal circuit connected between an electronic device and a transmission path comprising first and second terminals connected to said electronic device, third and fourth terminals connected to said transmission path, a first voltage source, a second voltage source, means for generating first and second control signals, first means responsive to said first control signal for applying said first voltage from said first voltage source to said first and third terminals and said second voltage from said second voltage source to said second and fourth terminals and for coupling signals between said electronic device and said transmission path, and second means responsive to said second control signal for applying said first voltage from said first voltage source to said first and fourth terminals and said second voltage from said second voltage source to said second and third terminals and for coupling signals between said electronic device and said transmission path whereby the voltage polarity across said first and second terminals remains invariant and the voltage polarity across said third and fourth terminals is reversible.

* * * * *